US005338365A

United States Patent [19]

Stapp et al.

[11] Patent Number: 5,338,365

[45] Date of Patent: Aug. 16, 1994

[54] APPARATUS FOR CONDITIONING CONFECTIONERS' SUGAR AND THE LIKE

[75] Inventors: Georg Stapp, Dreieichenhain; Paul G. Dellmann, Darmstadt, both of Fed. Rep. of Germany

[73] Assignee: Dietrich Reimelt KG, Rodermark/Urberach, Fed. Rep. of Germany

[21] Appl. No.: 149,017

[22] Filed: Nov. 8, 1993

Related U.S. Application Data

[63] Continuation of Ser. No. 890,628, May 28, 1992, abandoned.

[30] Foreign Application Priority Data

May 30, 1991 [DE] Fed. Rep. of Germany ....... 9106640

[51] Int. Cl.[5] ............................................... B01J 3/00

[52] U.S. Cl. ......................................... 127/2; 127/5; 127/12; 127/15; 127/19

[58] Field of Search ...................... 127/2, 5, 12, 15, 19

[56] References Cited

U.S. PATENT DOCUMENTS 3,137,592 6/1964 Protzman et al. .................... 127/71

*Primary Examiner*—Paul Lieberman
*Assistant Examiner*—Patricia L. Hailey
*Attorney, Agent, or Firm*—Darby & Darby

[57] ABSTRACT

Apparatus for conditioning freshly ground confectioners' sugar employs a closed vessel with an inlet for unconditioned sugar, an outlet for conditioned sugar, and an agitating unit which is installed in the vessel and not only agitates the admitted material but also conveys it toward the outlet into the range of a feed screw. The bottom of the vessel is permeable to gases and receives air which has been conditioned to have an optimum temperature and moisture content prior to admission into the vessel. Spent air is evacuated through a duct which contains a filter serving to intercept conditioned sugar. The conditioned air can heat or cool, increase the moisture content or reduce the moisture content of sugar in the vessel.

17 Claims, 2 Drawing Sheets

APPARATUS FOR CONDITIONING CONFECTIONERS' SUGAR AND THE LIKE

This is a continuation of application Ser. No. 07/890,628, filed May 28, 1992, now abandoned.

BACKGROUND OF THE INVENTION

The invention relates to improvements in apparatus for conditioning flowable bulk materials, particularly confectioners' sugar.

Confectioners' sugal is obtained as a result of grinding or crushing granulated sugar. This entails recrystallization of the treated material whereby the developing sugar crystals take up moisture. Therefore, it is necessary to subject ground granulated sugar to a drying and conditioning treatment prior to introduction of confectioners' sugar into bags, boxes or other receptacles. In accordance with presently prevailing practice, confectioners' sugar (i.e., pulverulent sugar) is stored and dried in silos. The arrangement is such that the supply of confined pulverulent material is circulated along a path having a portion extending through the silo and a portion outside of the silo. Such mode of altering the moisture content of confectioners' sugar is time consuming and must be carried out in bulky, complex and expensive apparatus to thus contribute to a significant increase in the cost of the ultimate product.

OBJECTS OF THE INVENTION

An object of the invention is to provide an apparatus which can condition large quantities of flowable bulk material, such as confectioners' sugar, with little loss in time and in a small area.

Another object of the invention is to provide an apparatus which can alter the moisture content of freshly ground confectioners' sugar within a minute fraction of the time which is required to carry out such operation in presently available apparatus.

A further object of the invention is to provide the apparatus with novel and improved means for rapidly altering the moisture content of confectioners' sugar.

An additional object of the invention is to provide the apparatus with novel and improved means for ensuring uniform conditioning of each and every part of a batch of flowable bulk material.

Still another object of the invention is to provide the apparatus with novel and improved means for increasing or reducing the moisture content of a supply of flowable bulk material.

A further object of the invention is to provide the apparatus ,with novel and improved means for conveying flowable bulk material to, at and from the conditioning station.

Another object of the invention is to provide a method which can be resorted to for conditioning of confectioners' sugar at a small fraction of the cost of heretofore known treatments.

SUMMARY OF THE INVENTION

The invention is embodied in an apparatus for conditioning flowable bulk material, such as confectioners' sugar. The improved apparatus comprises a preferably elongated substantially horizontal vessel having at least one inlet for unconditioned bulk material and at least one outlet for conditioned bulk material, means for agitating the material in the vessel between the at least one inlet and the at least one outlet, means for admitting into the vessel a gaseous conditioning fluid (such as air), and means for imparting to the fluid a predetermined temperature and/or moisture content prior to admission into the vessel. The vessel can be provided with a gas permeable bottom for admission of gaseous fluid into contact with the confined bulk material, and at least a portion of such bottom can consist of frit.

The gas admitting means can comprise at least one plenum chamber which is outwardly adjacent, and is partially bounded by, the permeable bottom. It is presently preferred to employ gas admitting means which includes a series of plenum chambers, and the series then extends longitudinally of the bottom. Such apparatus can further comprise suitable valves or other means for individually controlling the flow of conditioned gaseous fluid from the imparting means to each of the chambers.

The apparatus can further comprise a centrifugal separator or spreader in the at least one inlet of the vessel.

Still further, the apparatus can comprise means for positively evacuating or expelling conditioned bulk material from the vessel through the at least one outlet. Such evacuating means can comprise an elongated rotary feed screw which extends longitudinally of the vessel and preferably exhibits a progressive characteristic curve.

The agitating means can comprise a plurality of vanes or blades which are rotatable in the vessel about an axis extending longitudinally of the vessel. At least some of the blades serve to orbit along paths having portions which are closely adjacent the bottom of the vessel to thus prevent incrustation of bulk material at the bottom. The bottom can have a cylindrical internal surface which at least substantially conforms to the paths of the orbiting blades.

The agitating means of the improved apparatus can be constructed and mounted in the vessel in such a way that its blades convey bulk material from the inlet toward the outlet and hence into the range of the aforementioned evacuating means, such as a feed screw at the outlet.

The vessel is preferably closed, and such apparatus further comprises means for evacuating gaseous fluid from the vessel. The fluid evacuating means can comprise at least one duct which contains one or more filters serving to intercept bulk material. Alternatively or in addition to one or more filters, the at least one duct can confine one or more cyclones.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
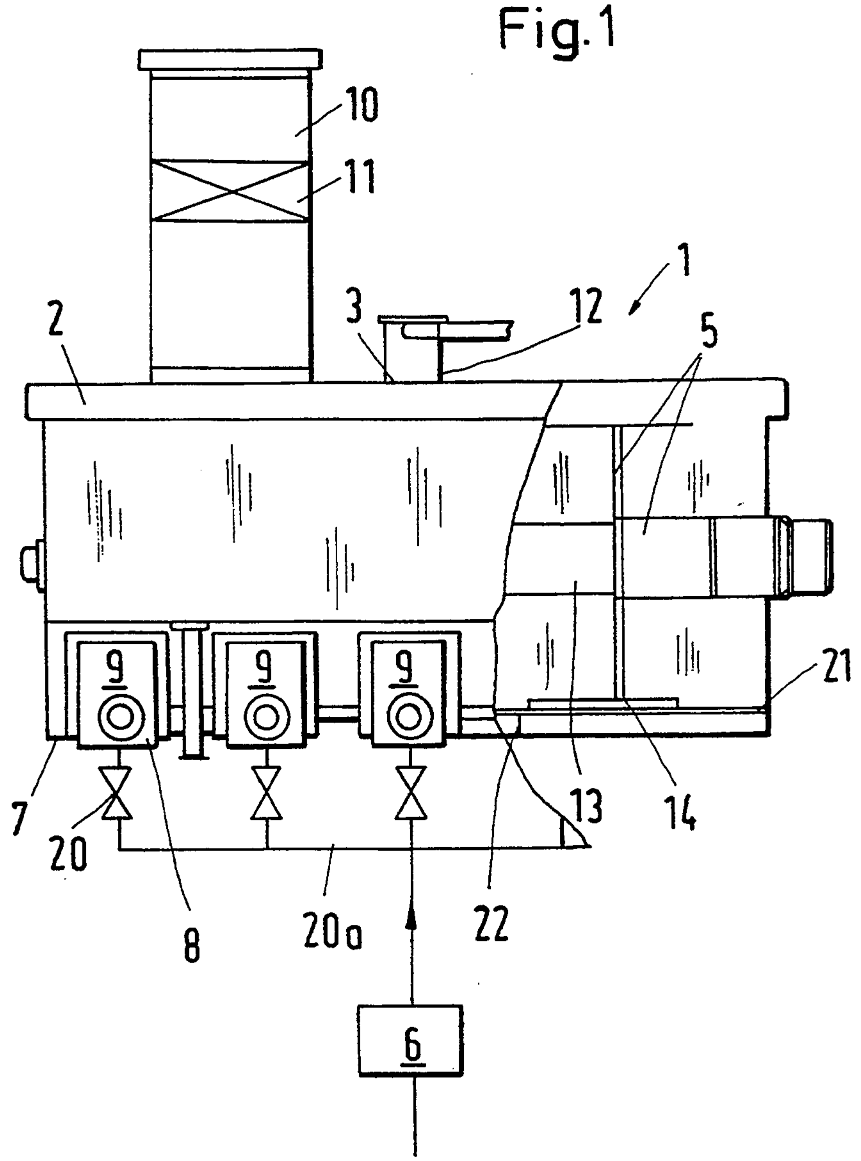
FIG. 1 is a schematic partly elevational and partly longitudinal vertical sectional view of an apparatus which embodies one form of the invention and wherein the gas admitting means comprises a row of plenum chambers at the exterior of the gas-permeable bottom of the vessel.
Figure 2:
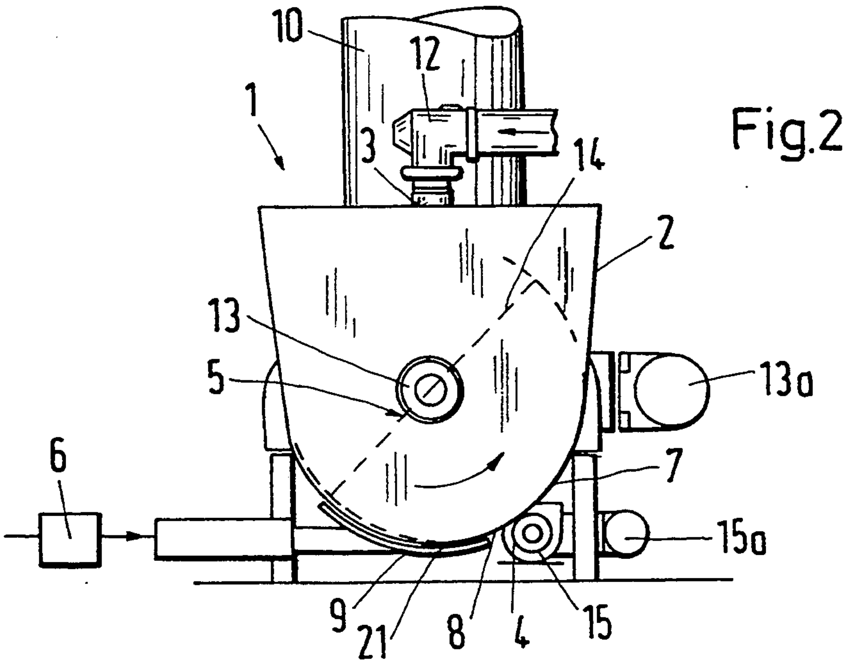
FIG. 2 is a fragmentary end elevational view of the apparatus which is shown in FIG. 1.

FIGS. 1 and 2 show a conditioning apparatus 1 which can be utilized with advantage to influence the moisture content of successive batches or of a continuous flow of flowable bulk material, such as confectioners' sugar. The apparatus 1 comprises an elongated substantially horizontal closed or nearly closed vessel 2 with an inlet 3 for admission of unconditioned flowable bulk material (hereinafter called sugar for short) at the top, and with an outlet 4 for evacuation of conditioned sugar at the bottom. The vessel 2 confines an agitating device 5 which stirs the contents of the vessel and preferably also serves to convey sugar in a direction from the inlet 3 toward the outlet 4.

The bottom 7 of the vessel 2 resembles or constitutes an elongated semicylindrical shell or trough, and at least a portion (21) of this bottom is permeable to gases but is capable of confining sugar in the interior of the vessel. The external surface or outer side 8 of the bottom 7 is adjacent a row of spaced-apart discrete plenum chambers 9 which serve to admit compressed gaseous conditioning fluid (normally air) into the lower part of the internal space of the vessel 2, and the thus admitted gaseous fluid (hereinafter called air) is evacuated through an upright duct 10 which is adjacent the inlet 3 and contains or is integral with one or more filters 11 serving to intercept conditioned sugar which tends to escape from the vessel with the stream of compressed conditioning air.

The plenum chambers 9 can receive conditioned air from a conditioning device 6 which is provided with means for increasing or reducing the moisture content and/or for raising or lowering the temperature of air to be admitted into one or more chambers 9. FIG. 1 shows that the outlet of the conditioning device 6 can be connected with any one of the row of four, five or more chambers 9 by a discrete conduit 20*a* containing a suitable flow regulating valve 20. This renders it possible to use one or more selected chambers 9 for admission of conditioned air into one or more portions of the internal space of the vessel 2 while the other chamber or chambers 9 remain sealed from the conditioning device 6. Furthermore, the valves 20 render it possible to select the rate of admission of conditioned air into the plenum chambers 9, i.e., the rate of admission may be higher via one or more plenum chambers but lower through the remaining plenum chamber or chambers. If the conditioning device 6 is provided with two or more outlets for discharge of air at different temperatures or for discharge of air streams having different moisture contents, the conditioning action within the vessel 2 can be regulated with an even higher degree of accuracy and the confined sugar can be influenced within an even wider range of temperatures and/or moisture contents.

Conditioned air which is admitted through one or more plenum chambers 9 rises in the vessel 2 in a direction from the gas-permeable portion 21 of the bottom 7 to penetrate into and through the confined mass of sugar while the sugar is agitated by the orbiting paddles, vanes or blades 14 of the agitating unit 5, and the thus spent air enters the duct 10 to be evacuated into the atmosphere through the filter or filters 11 which intercept particles of sugar and thus ensure that conditioned sugar can be evacuated only through the outlet 4.

For example, the permeable portion 21 of the bottom 7 can be made of frit, such as sintered vitreous material, which offers relatively low resistance to the flow of conditioning air into the vessel 2 but prevents the escape of minute as well as minutest particles of sugar. For example, the dimensions of the pores in the permeable portion 21 of the bottom 7 can be less than 40–50 μm, preferably less than 30–40 μm which suffices to ensure that the sugar remains confined in the vessel but the portion 21 can readily admit conditioning air from that chamber 9 or from those chambers 9 which are connected to the outlet or outlets of the conditioning device 6.

Neighboring plenum chambers 9 are separated from each other by partitions 22. The character 12 denotes a centrifugal separator i.e. a spreader or distributor which is installed in or at the inlet 3 and serves to ensure uniform distribution of admitted sugar in the interior of the vessel 2.

The agitating unit 5 comprises an elongated horizontal shaft 13 which extends longitudinally of the vessel 2 and carries the blades or vanes 14. The paths of orbital movement of some or all of the blades 14 are selected in such a way that their radially outermost portions are closely or immediately adjacent the concave inner side of the bottom 7. This ensures that the blades 14 prevent accumulations of encrustated sugar on the inner side of the bottom 7. The axis of the shaft 13 is preferably parallel to the axis of the cylindrical surface including the concave internal surface of the bottom 7. The blades 14 not only serve to advance the admitted mass of sugar in a direction from the inlet 3 toward the outlet 4 but they also ensure uniform distribution of inflowing conditioned air in each and every portion of the agitated mass of sugar in the interior of the vessel 2 when the apparatus 1 is in use. The motor for the shaft 13 of the agitating unit 5 is shown at 13*a*. It will be seen that the plenum chambers 9 cooperate with the agitating unit 4 to ensure adequate conditioning of each and every portion of the confined charge of sugar. The plenum chambers 9 cause conditioned air to rise from the inner side of the permeable portion 21 of the bottom 7 toward the evacuating duct 10, and the blades 14 of the agitating device 5 ensure that the entire confined charge of sugar is agitated so that the entire charge is adequately conditioned prior to reaching the outlet 4.

Figure 3:
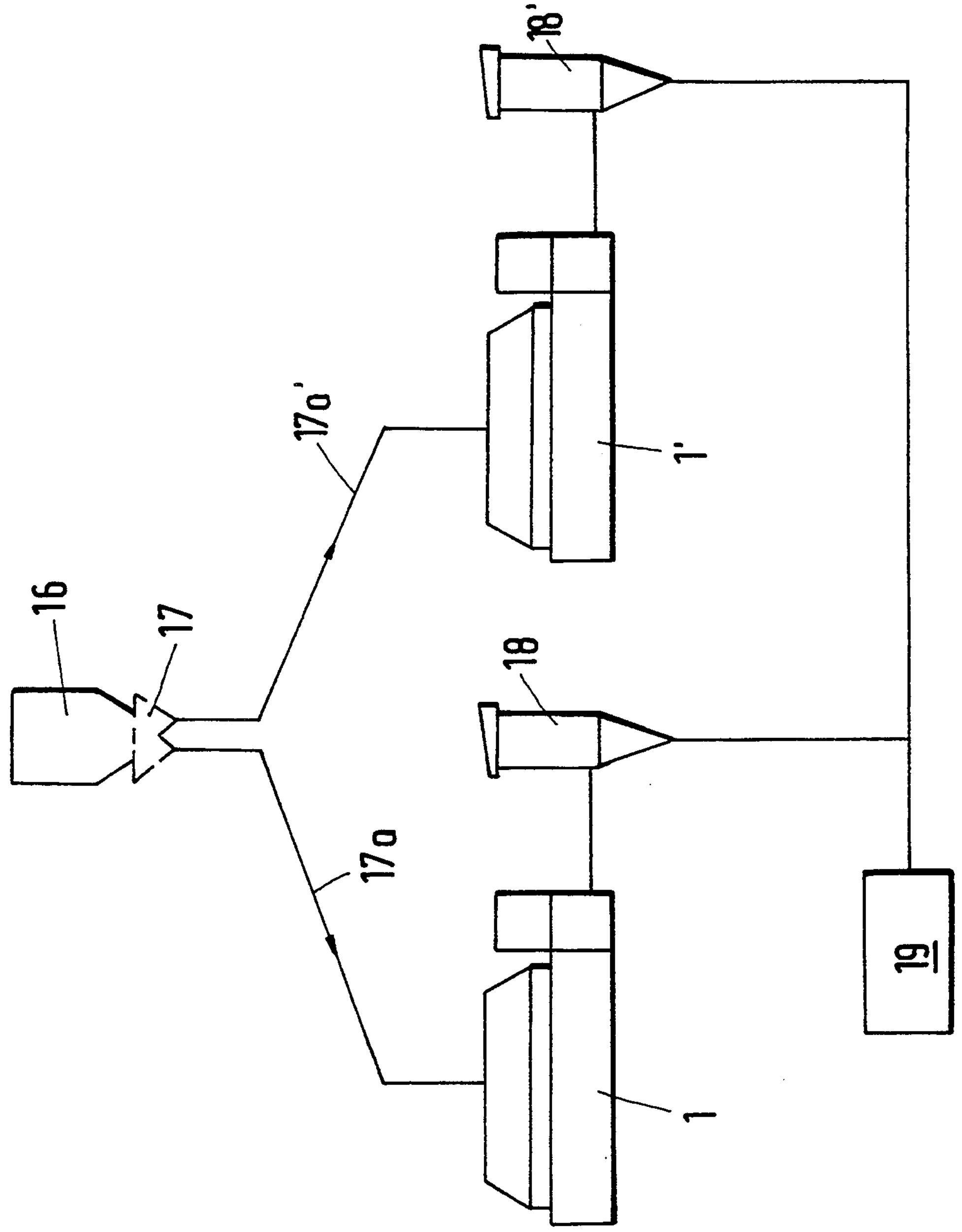
FIG. 3 is a diagrammatic view of a production line with two conditioning apparatus which supply conditioned bulk material to a packing machine.

The inlet 3 receives charges or a continuous flow of sugar by way of a pneumatic conveyor system 17*a* (FIG. 3). The means for evacuating (or for promoting evacuation of) conditioned sugar from the vessel 2 comprises an elongated feed screw 15 which extends in parallelism with the axis of the shaft 13 and receives conditioned sugar which is conveyed by the blades 14 of the agitating device 5. The feed screw 15 is preferably designed in such a way that its feeding or advancing action increases in a direction toward the outlet 4, i.e., the evacuating means including the feed screw 15 can be said to have a progressive characteristic curve. The feed screw 15 conveys properly conditioned sugar to storage (note the silo 18 in FIG. 3) or directly to a packing machine 19 (also shown in FIG. 3).

As already mentioned above, the conditioning device 6 can be designed to increase or reduce the moisture content of air which is to be fed into the chambers 9. Furthermore, the conditioning device 6 can be designed to raise or lower the temperature of air, depending upon the temperature and moisture content of sugar which is caused to enter the inlet 3 of the vessel 2.

The extent and the nature of conditioning of air in the device 6 prior to admission into one or more plenum chambers 9 depend on the temperature and moisture content of flowable bulk material which is being supplied into the inlet 3 of the vessel 2 forming part of the conditioning apparatus 1. For example, if the flowable bulk material to be conditioned is confectioners' sugar, the temperature of conditioned air which is admitted into the plenum chambers 9 can be in the range of 20–90° C. provided that the moisture content of sugar is between 30 and 70 percent. It has been found that the improved apparatus can condition confectioners' sugar within intervals which constitute minute fractions of periods of time required to condition confectioners' sugar in accordance with heretofore known methods. Thus, instead of requiring several days, the method which is being carried out in the improved apparatus can be completed within n times 10 minutes wherein n is a whole number less than ten.

In addition to performing a simple agitating action and urging the charge of sugar in the vessel 2 in a direction toward and into the range of the feed screw 15, the agitating device 5 performs the important and advantageous function of assisting the centrifugal separator 12 in spreading the charge in the interior of the vessel and in conveying each portion of the charge into those portions of the internal space of the vessel where the ascending conditioning air is most likely to perform an optimal drying, moisturizing, cooling and/or heating action. This ensures that each and every portion of a charge in the vessel 2 is conditioned to the same extent.

The conditioning device 6 can comprise one or more blowers which draw atmospheric air and convey such air toward and into the conduits 20*a* for the valves 20. On its way through the conditioning unit 6, air which is drawn from the atmosphere is heated or cooled by one or more heat exchangers and its temperature can be raised or lowered, depending on the moisture content and on the characteristics of the charge of sugar in the vessel 2.

The agitating device 5 completes the loosening of bulk material of the charge in the vessel 2 after a relatively short period of time, and such loosening further ensures that each portion of the charge is conditioned to the same extent because the stream or streams of conditioned air which is admitted from one or more plenum chambers 9 and enters the vessel 2 through the porous portion 21 of the bottom 7 are free to contact all particles of the charge before such particles reach the outlet 4 to be evacuated into the silo 18 and thence into the packing machine 19. The blades 14 of the agitating device 5 cooperate with the ascending jets of compressed conditioned air to break up any agglomerations of sugar particles in the vessel and to ensure uniform conditioning. This facilitates the metering of sugar in the packing machine so that each bag, box or any other container for confectioners' sugar receives an accurately determined quantity of flowable material.

If necessary for more satisfactory conditioning action, the conditioning unit 6 can admit relatively moist conditioned air to one or more plenum chambers 9 and relatively dry conditioned air to the other plenum chamber or chambers. Thus, the apparatus can cause a batch to first accept moisture from inflowing conditioned air and to thereupon exchange moisture with one or more streams of air in one and the same vessel.

Though the apparatus can employ a gaseous conditioning fluid other than air, air is preferred at this time because it is available at the locus of erection of the apparatus 1 as well as because it can be rapidly heated, cooled, moisturized or dried at a relatively low cost.

The means for admitting conditioned air into the vessel 2 can comprise a single plenum chamber 9. It is presently preferred to employ two or more plenum chambers because this renders it possible to admit several streams or flows one or more of which contain relatively dry air and the other or others of which contain air having a higher moisture content. Furthermore, one or more plenum chambers 9 can receive relatively cool air and the other chamber or chambers can receive hot or warm air. Individual adjustability of the rate of flow of air to discrete plenum chambers 9 renders it possible to accurately select the characteristics of the combined stream of air which is admitted into the vessel 2 and contacts the charge of sugar therein. The provision of several plenum chambers 9 which admit conditioned air into spaced apart portions of the vessel 2 is desirable and advantageous on the additional ground that this renders it possible to regulate the pressure in various zones of the internal space of the vessel.

If the apparatus 1 is to be simplified, the inlet 3 receives freshly ground granulated sugar (i.e., confectioners' sugar) by gravity flow. The centrifugal separator 12 has been found to greatly reduce the likelihood of non-uniform distribution of the material of a charge in the vessel 2. The placing of such separator into or at the inlet 3 even further reduces the likelihood of non-uniform distribution of the material which forms a charge in the vessel 2 because the spreading or distribution of admitted charge begins right at the locus of entry into the internal space of the vessel 2. Therefore, the conditioning action is completed within an even shorter interval of time because the period of dwell of a charge in the vessel 2 can be shortened accordingly.

The feed screw 15 can be replaced by or used in combination with other suitable evacuating means which expels freshly conditioned sugar from the vessel 2. The illustrated feed screw 15 preferably extends in parallelism with the axis of the cylinder including the concave internal surface of the bottom 7 and is designed to intensify its material conveying or expelling action in a direction toward the outlet 4. This can be achieved by employing a feed screw having a progressive lead or a degressive core.

The illustrated blades 14 of the agitating device 5 have portions which extend radially of the shaft 13 and portions which extend circumferentially so that each such circumferentially extending portion sweeps along the internal surface of the bottom 7 once during each revolution of the shaft 13. This has been found to ensure intensive agitation of the confined batch and rapid and uniform conditioning of pulverulent material. It is advantageous to design the agitating device 5 in such a way that its blades 14 can effectively agitate and mix each and every portion of the confined batch. Moreover, and as already mentioned above, the blades 14 should be capable of preventing incrustation of the charge along the inner side of the bottom 7 because this would reduce the permeability of the portion 21 and could result in unsatisfactory or unpredictable conditioning action.

The motor 13*a* for the feed screw 13 is started when the conditioning of a charge in the vessel 2 is completed. The feed screw 15 is then rotated simultaneously with the shaft 13 of the agitating device 5, and the blades 14 urge the confined freshly conditioned charge into the range of the feed screw for rapid evacuation from the vessel 2, e.g., into the silo 18 of FIG. 3.

In addition to or in lieu of one or more filters 11, the duct 10 for evacuation of spent gaseous conditioning fluid can contain at least one cyclone, not shown. Such cyclone is also capable of preventing escape of conditioned flowable bulk material from the vessel 2 via duct 10.

FIG. 3 shows a production line which employs two conditioning apparatus 1, 1' two reservoirs in the form of silos 18, 18', a packing machine 19, a source of supply 16 of granulated sugar, and one or more grinding mills 17 which comminute granulated sugar and deliver the thus obtained confectioners' sugar into the pneumatic conveyor 17*a* and/or 17*a'* for delivery to the inlet of the vessel forming part of the apparatus 1 and/or 1'.

While the conveyor 17*a* delivers a batch of pulverulent sugar from the mill or mills 17 to the vessel of the apparatus 1, the supply of sugar which was previously admitted into the vessel of the apparatus 1' through the pneumatic conveyor 17*a'* is being conditioned for subsequent admission into the reservoir or silo 18' whence the conditioned bulk material enters the packing machine 19. When the vessel 2 of the apparatus 1 receives a full charge of unconditioned sugar, the mills 17 proceed to deliver a charge to the vessel of the apparatus 1' via pneumatic conveyor 17*a'* while the apparatus 1 is in the process of conditioning the just received charge, and the freshly conditioned charge or batch of confectioners' sugar is then admitted into the reservoir or silo 18 preparatory to admission into the packing machine 19. The same procedure is repeated again and again as long as necessary. The provision of two conditioning apparatus renders it possible to operate the packing machine 19 at full capacity and without any interruptions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for conditioning flowable bulk material, comprising a vessel having at least one inlet for unconditioned flowable bulk material and at least one outlet for conditioned flowable bulk material; means for agitating the material in the vessel between said at least one inlet and said at least one outlet; means for admitting into the vessel a gaseous conditioning fluid to contact said flowable bulk material and to regulate a moisture content of said flowable bulk material within said vessel; and means for imparting to the fluid a predetermined temperature and a predetermined moisture content prior to admission into said vessel.

2. The apparatus of claim 1, wherein the conditioning fluid is air.

3. The apparatus of claim 1, further comprising means for evacuating conditioned bulk material from said vessel through said at least one outlet.

4. The apparatus of claim 3, wherein said vessel is elongated and said evacuating means comprises a feed screw having a progressive characteristic curve and extending longitudinally of said vessel.

5. The apparatus of claim 1, wherein said vessel is elongated and includes a bottom, said agitating means including a plurality of blades fixed to a shaft rotatable in said vessel about an axis extending longitudinally of the vessel, at least some of said blades being arranged to orbit along paths having portions closely adjacent said bottom.

6. The apparatus of claim 1, further comprising means for evacuating conditioned bulk material from said vessel through said at least one outlet, said agitating means comprising means for conveying bulk material in said vessel from said at least one inlet to said evacuating means.

7. The apparatus of claim 1 wherein said agitation means comprises orbiting blades.

8. Apparatus for conditioning flowable bulk material, comprising a vessel having at least one inlet for unconditioned flowable bulk material and at least one outlet for conditioned flowable bulk material; means for agitating the material in the vessel between said at least one inlet and said at least one outlet; means for admitting into the vessel a gaseous conditioning fluid to contact said flowable bulk material; means for imparting to the fluid a predetermined temperature and a predetermined moisture content prior to admission into said vessel; and a centrifugal separator for bulk material disposed at said at least one inlet.

9. Apparatus for conditioning flowable bulk material, comprising a vessel having at least one inlet for unconditioned flowable bulk material and at least one outlet for conditioned flowable bulk material; means for agitating the material in the vessel between said at least one inlet and said at least one outlet; means for admitting into the vessel a gaseous conditioning fluid to contact said flowable bulk material; means for imparting to the fluid a predetermined temperature and a predetermined moisture content prior to admission into said vessel; said vessel comprising a bottom having a cylindrical internal surface.

10. Apparatus for conditioning flowable bulk material, comprising a vessel having at least one inlet for unconditioned flowable bulk material and at least one outlet for conditioned flowable bulk material; means for agitating the material in the vessel between said at least one inlet and at least one outlet; means for admitting into the vessel a gaseous conditioning fluid to contact said flowable bulk material; and means for imparting to the fluid a predetermined temperature and a predetermined moisture content prior to admission into said vessel, wherein said vessel further includes a gas-permeable bottom for admission of conditioning fluid into the vessel.

11. The apparatus of claim 10, wherein said admitting means includes at least one plenum chamber which is outwardly adjacent said bottom.

12. The apparatus of claim 11, wherein said bottom is elongated and said admitting means includes a series of plenum chambers with said series extending longitudinally of said bottom.

13. The apparatus of claim 11, wherein said admitting means comprises a plurality of plenum chambers and means for individually controlling the flow of gaseous fluid from said imparting means to each of said chambers.

14. The apparatus of claim 10 wherein at least a portion of said bottom is made of sintered material.

15. Apparatus for conditioning flowable bulk material, comprising a closed vessel having at least one inlet for unconditioned material and at least one outlet for conditioned material, means for agitating the material in the vessel between said at least one inlet and at least one outlet; means for admitting into the vessel a gaseous conditioning fluid to contact said flowable bulk material; means for evacuating said gaseous fluid from said vessel; and means for imparting to the fluid a predetermined temperature and a predetermined moisture content prior to the fluid's admission into said vessel.

16. The apparatus of claim 15, wherein said evacuating means comprises at least one duct, and further comprising at least one filter provided in said at least one duct to intercept bulk material.

17. The apparatus of claim 15, wherein said evacuating means comprises at least one duct, and further comprising at least one cyclone in said at least one duct.

* * * * *